United States Patent Office 3,145,062
Patented Aug. 18, 1964

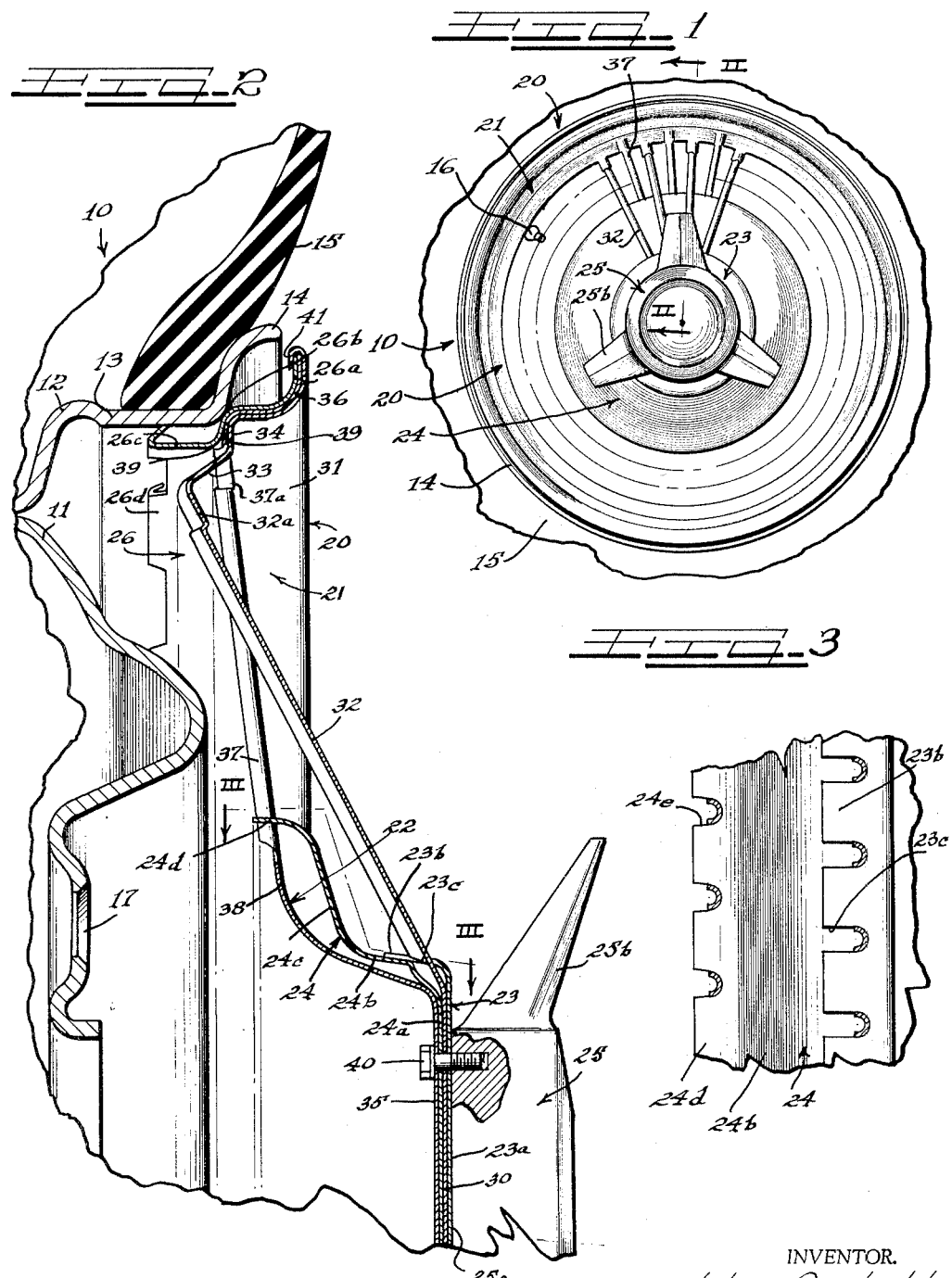

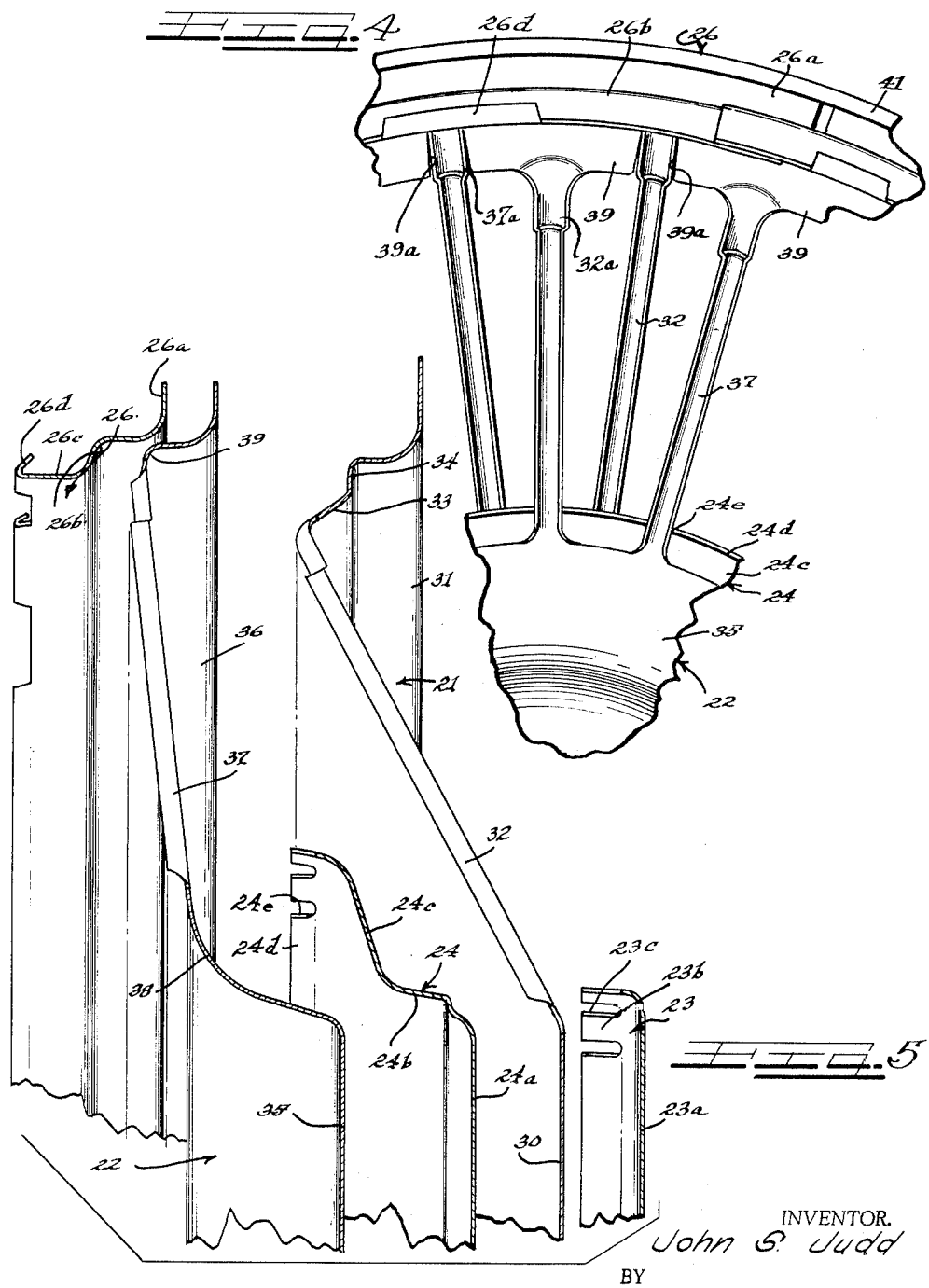

3,145,062
SPOKED WHEEL COVER
John S. Judd, Birmingham, Mich., assignor to Lyon Incorporated, Detroit, Mich., a corporation of Delaware
Filed Feb. 19, 1963, Ser. No. 259,553
10 Claims. (Cl. 301—37)

The present invention relates generally to a wheel cover or cover structure for disposition on the outer side of a vehicle wheel.

For a number of years there has been considerable demand by the public upon the automobile industry for vehicle wheels having a wire spoked appearance. There are a number of U. S. patents showing different types of wheel covers that have been employed in an effort to create the desired effect. Where the spoked covers have been made from strip stock for economy reasons, considerable difficulty has been encountered in providing a cover which closely resembles a spoked wheel.

According to the present invention, a new and improved cover structure has been developed wherein the spokes more closely simulate a conventional spoked wire wheel and which cover structure can be manufactured essentially from strip stock. The present cover structure has means disposed between the spokes at the ends of the spokes which reinforce the cover and which enable a more accurate wire wheel simulating apparance to be imparted to the cover.

An important object of this invention is to provide a cover structure having multi-parts formed and secured together in a new and improved way whereby a spoked wire wheel appearance is imparted to the cover structure.

Still another object of this invention is to provide a spoked wire wheel simulating cover structure comprised of a series of separate members which can be manufactured essentially from strip stock.

Yet another object of this invention is to provide a spoked type cover structure having spokes with opposite ends encased in skirts disposed therearound for reinforcing the spokes and for improving the appearance of the cover structure.

According to important features of this invention I have developed a cover structure which is comprised of six separate cover members or parts. The cover structur includes an axially outer spoked cover plate having a first set of circumferentially spaced spokes including a center plate portion and an axially outer exposed ring portion with the spokes being formed integral at opposite ends with said portions as a one-piece stamping. The cover structure further includes an axially inner spoked cover plate having a second set of circumferentially spaced spokes which are disposed circumferentially between the spokes of the first set. The axially inner spoked cover plate also has an inner plate portion and an outer plate portion which are disposed axially behind the corresponding portions of the axially outer spoked cover plate. Circular cover members are disposed on axially opposite sides of said central plate portion on the axially outer spoked cover plate. The axially outermost cover member has notches in its outer margin which are engaged over the first set of spokes and the axially outer margin of the other or axially inner circular cover member has an outer margin provided with notches which are engaged over the second set of spokes. It is in this way that the cover structure is provided with skirts which are disposed about radially inner ends of the spokes in both sets to rigidify the interengagement of the components and to give the cover structure a spoked wire wheel appearance.

All of the components thus far described, comprise stampings as does an outer retaining ring. The retaining ring is integrated with the radially outer margin of the components of the cover structure and provides means for co-acting with a wheel flange for holding the cover structure on a vehicle wheel. A spoked medallion is mounted on an axially outer side of the axially outer circular plate member and means is provided securing the components of the cover with the medallion in unitary assembly together and in such a way as to prevent relative movement of these components at a central area of the cover structure.

Other objects and features of this invention will more fully become apparent in view of the following detailed description taken in conjunction with the accompanying drawings illustrating therein a single embodiment and in which:

On the drawings:

FIGURE 1 is a fragmentary front view of a wheel structure;

FIGURE 2 is an enlarged fragmentary vertical section taken substantially on the line II—II looking in the direction indicated by the arrow as seen in FIGURE 1;

FIGURE 3 is an enlarged fragmentary view with parts shown in section illustrating the manner of engagement of the spokes with portions of a cover structure;

FIGURE 4 is an enlarged fragmentary rear elevation of the cover structure; and

FIGURE 5 is an enlarged fragmentary exploded view illustrating the components of my cover structure.

As shown on the drawings:

Shown in FIGURES 1 and 2 is a wheel structure 10 which includes a wheel body part 11 and a tire rim part 12. The tire rim 12 has an intermediate axially elongated radially inwardly facing rim flange 13 and a terminal rim flange 14. Mounted upon these rim flanges is a pneumatic tire 15 which may be of any suitable type such as a tubeless tire or a tube-type tire. The tire 15 is inflatable by inserting air into valve stem 16 shown in FIGURE 1. In order to secure the wheel structure 10 upon the axle of a vehicle, axle lugs are inserted through hole 17 in the body part 11 thereby securing the wheel structure in assembled relation.

According to my invention, I have provided a new type cover structure identified generally at 20. The cover structure is comprised of six separate parts, five of which are preferably formed as stampings and the sixth part may comprise a casting.

The cover structure 20 includes an axially outer spoked cover plate 21, an axially inner spoked cover plate 22, an axially outer circular cover member 23, an axially inner circular cover member 24 disposed between the plates 21 and 22, a cast medallion 25, and a retaining ring 26. The parts 21, 22, 23, 24 and 26 preferably comprise stampings.

The axially outer spoked cover plate 21 includes a circular central plate portion 30 and an outer ring portion 31 which are joined together in integral relation by a first set of generally radially outwardly axially inwardly extending U-shaped spokes 32. It will be noted the outer ring portion 31 is of a stepped configuration and is provided with a generally radially and axially inwardly inclined inner ring flange portion 33 which offsets the radially outer end of the spokes 32 axially inwardly with respect to the radially inner ends of the spokes 32.

The axially inner spoked cover plate 22 includes a radially inner circular plate portion 35 and a radially outer stepped ring portion 36 which is adapted to be concealed by the outer ring portion 31 when the components of the cover structure are assembled together. A second set of circumferentially spaced generally radially outwardly U-shaped spokes are joined at opposite ends with the circular cover portion 35 and the outer ring portion 36. More particularly, the central plate portion 35 has an axially rearwardly arcuately shaped margin 38 which is joined with the radially inner ends of the spokes 37. Also, the outer ring portion 36 has a generally radially inwardly extending portion 39 which joins the outer ring portion 36 with the radially outer ends of the spokes 37. The radially inwardly extending spoke portion 39 has a series of notches 39a (FIGURE 4) and the spokes 32 are engaged in these notches when the components of the cover are assembled to rigidify the outer margin of the cover structure 20.

The cover structure 20 further includes an axially outer circular cover member 23 which is positioned axially outwardly of the central plate portion 30 on the axially outer spoked cover plate 21. The cover member 23 includes a relatively flat circular cover member portion 23a and an axially inwardly extending portion or axially extending radially inner skirt 23b which is notched at circumferentially spaced intervals to provide axially inwardly opening U-shaped notches 23c. These notches 23c are adapted to engage over the radially inner ends of the spokes 32 when the components of the cover structure 20 are assembled together in order to rigidify the outer margin of the central area of the cover structure and in order to impart a wire wheel simulating appearance to the cover structure.

The axially inner circular cover member 24 includes a central circular cover portion 24a having an outer margin which is defined by an axially inwardly extending circular cover portion 24b and a radially outwardly extending circular cover portion 24c. The margin terminates in an axially inwardly extending annular skirt 24d having a series of circumferentially spaced axially inwardly opening notches 24e which are adapted to engage over the radially inner ends of the spokes 37 when the components of the cover structure are in assembly together as shown in FIGURE 3. It is in this manner that a wire wheel simulating appearance can be imparted to the spokes 37 by substantially encircling the radially inner ends of the spokes with the skirt 24d in the manner described.

In order to secure the components at the central area of the cover structure and in order to decorate the cover structure, the cast medallion 25 is mounted on the circular portion 23a of the axially outer spoked cover member 23. Bolts 40 are engaged through the central portions of the cover members 21–24, inclusive and are engaged in threaded assembly with the medallion 25. It is in this manner that the central area of the cover structure is held so that the components cannot move axially to cause any rattling noise.

The retaining ring 26 is preferably formed of strip stock with the ends of the strip disposed in confronting relation as shown in FIGURE 4. The retaining ring has a stepped outer margin 26a which generally corresponds to the configuration of the outer ring portions 31 and 36 on the cover plates 21 and 22 for nested assembly together as shown in FIGURE 2. The retaining ring 26 is further provided with a shoulder 26b for engagement with the tire rim 12 at the junction between the rim flanges 13 and 14. A radially inner retaining ring margin 26c is provided with a series of circumferentially spaced resiliently deflectable retaining extensions or fingers 26d which are adapted to bite into the intermediate rim flange to hold the cover structure in retained assembly with the tire rim 12. The fingers 26d may be of any suitable type. Preferably, the retaining ring 26 is comprised of a stainless type of spring steel to increase the life of the retaining fingers so that the cover structure 20 may be repeatedly applied and removed to the tire rim. The fingers 26d may be grouped in sets about the circumference of the cover structure as is well known in the prior art.

In order to secure the components of the cover structure in assembly at the radially outer margin of the cover structure, the outer margin of the outer ring portion 31 is provided with a rolled-over bead or annular locking flange 41, as shown in FIGURE 2. It is in this manner that the components of the cover structure at its outer margin are secured against relative movement with respect to one another to prevent any rattling noise from developing during the rotation of the cover structure when being rotated on a vehicle wheel.

When the components of the cover structure 20 are in assembly, it will be noted that the sets of spokes 32 and 37 are disposed in criss-crossed relation with the inner ends of the spokes 32 being disposed axially outwardly of the inner ends of the spokes 37 and with the radially outer ends of the spokes 32 being disposed axially inwardly of the radially outer ends of the spokes 37. By crossing the sets of spokes in the manner described, the cover structure is made more rigid and capable of sustaining loads. Also, a wire wheel simulating appearance is imparted to the cover structure by crossing the sets of spokes in the manner described. In order that the stamped spokes will more closely simulate wire spokes and in order to rigidify the spokes, the spokes 32 and 37 are provided with simulated ferrules 32a and 37a at the radially outer ends thereof generally at the respective junction of the spokes with the outer ring portion of the associated spoked cover member. The ornament or spinner 25 may be comprised of any suitable material such as synthetic plastic, die cast aluminum and the like.

It will be appreciated that the retaining means illustrated is of the type which enables the cover to be engaged in snap-on pry-off assembly with the tire rim. In the assembly of the cover structures on the tire rim, the retaining fingers are axially aligned with the intermediate rim flange and the cover is then pressed against the wheel until the cover shoulder 26b is engaged against the tire rim. In order to remove the cover structure 20 from the wheel, a pry-off tool may be inserted between the terminal rim flange 14 and the cover bead 41 whereupon the tool is progressively twisted and worked to cause the fingers 26b to be freed from the intermediate rim flange 13.

Although minor modifications might be suggested by those versed in the art, it should be understood that I wish to embody within the scope of the patent warranted hereon, all such modifications as reasonably and properly come within the scope of my contribution to the art.

I claim as my invention:

1. A cover structure comprising
   an axially outer spoked cover plate having a first set of circumferentially spaced spokes including a central plate portion and an outer exposed ring portion with the spokes being formed integral at one end with an outer margin of the central plate portion and integral with an axially inner margin of the outer ring portion,
   an axially inner spoked cover plate having a second set of circumferentially spaced spokes disposed circumferentially between the spokes of said first set and having an inner plate portion and an outer concealed ring portion disposed axially behind said central plate portion and said outer exposed ring portion with the concealed ring portion having generally radially inwardly opening notches between the spokes with said first set of spokes having outer spoke end portions lockingly engaged in said notches,
   an axially outer circular cover member positioned axially outwardly of the central plate portion on said axially outer spoked cover plate having an axially extending radially inner skirt at its outer margin provided with skirt notches engaged over radially inner ends of said first set of spokes,
   an axially inner circular cover member disposed axially between said cover plates and having an outer margin provided with an axially extending radially outer skirt having circumferentially spaced skirt notches engaged over said second set of spokes and with said outer skirt having a diameter positioning the outer skirt radially between said plate portions and said ring portions and radially outwardly of said radially inner skirt, an armed member mounted on an axially outer side of a central portion of said axially outer circular cover member having means securing said armed member in assembly with said axially inner and outer cover members and with said axially inner and outer cover plates, and a retaining ring disposed at an outer perimeter of the cover member having said outer exposed ring portion provided with a turned-under edge locking the retaining ring and said ring portion in assembly together and with said retaining ring having circumferentially resiliently deflectable retaining extensions disposed at its axially innermost margin for securing the cover structure on a vehicle wheel.

2. A cover structure comprising
an axially outer spoked cover plate having a first set of circumferentially spaced spokes including a central plate portion and an outer exposed ring portion with the spokes being formed integral at one end with an outer margin of the central plate portion and integral with an axially inner margin of the outer ring portion, an axially inner spoked cover plate having a second set of circumferentially spaced spokes disposed circumferentially between the spokes of said first set and having an inner plate portion and an outer concealed ring portion disposed axially behind said central plate portion and said outer exposed ring portion with the concealed ring portion having generally radially inwardly opening notches between the spokes with said first set of spokes having outer spoke end portions lockingly engaged in said notches, an axially outer circular cover member positioned axially outwardly of the central plate portion on said axially outer spoked cover plate having an axially extending radially inner skirt at its outer margin provided with skirt notches engaged over radially inner ends of said first set of spokes, an axially inner circular cover member disposed axially between said cover plates and having an outer margin provided with an axially extending radially outer skirt having circumferentially spaced skirt notches engaged over said second set of spokes and with said outer skirt having a diameter positioning the outer skirt radially between said plate portions and said ring portions and radially outwardly of said radially inner skirt, and a retaining ring secured with said ring portions at an outer perimeter of the cover structure with said ring having circumferentially spaced resiliently deflectable retaining extensions for securing the cover structure on a vehicle wheel.

3. A vehicle wheel cover structure comprising
an axially outer spoked cover plate having a first set of circumferentially spaced spokes including a central plate portion and an outer exposed ring portion with the spokes being formed integral at one end with an outer margin of the central plate portion and integral with an axially inner margin of the outer ring portion, the outer exposed ring portion having circumferentially spaced open sided notches at its inner margin, an axially inner spoked cover plate having a second set of circumferentially spaced spokes disposed circumferentially between the spokes of said first set and having an inner plate portion and an outer concealed ring portion disposed axially behind said central plate portion and said outer exposed ring portion with said second set of spokes having outer spoke end portions engaged in said notches in said outer exposed ring portion, the sets of spokes being disposed in axially crisscrossed relation for rigidly supporting the ring portions of the cover plates on the central plate portions, means substantially lockingly encasing and operatively engaged with radially inner ends of the spokes in both sets, and means mounted on an underside of the cover structure for securing the cover structure in removable assembly with a vehicle wheel.

4. The vehicle wheel cover structure of claim 3 further characterized by said means for lockingly encasing the spokes in each set comprising cover members having outer margins provided with circumferentially spaced axially inwardly opening U-shaped notches, the notches on one of the cover members being operatively engaged with radially inner ends of the spokes in one set and with the notches on the other cover member being operatively engaged with the radially inner ends of the spokes in another of the sets.

5. The vehicle cover structure of claim 2 further characterized by the notches on the cover members being generally of a U-shape and in nested engagement with the inner ends of the spokes, the notches on the axially inner circular cover member being disposed radially outwardly of the notches on the axially outer circular cover member.

6. The vehicle wheel cover structure of claim 3 further characterized by a medallion being mounted on an axially outer side of a central plate portion on said axially outer spoked cover plate and having means securing said central portions of said cover plates against one another with the medallion to preclude axial movement and rattling.

7. The cover structure of claim 2 further characterized by said spokes in said sets being disposed in axially crossed but circumferentially spaced relation to rigidly support the outer ring portions on the central plate portions and to impart a wire wheel simulating appearance to the cover structure.

8. The vehicle wheel cover structure of claim 2 further characterized by said spokes having simulated ferrules at radially outer ends at junctions of the spokes with the associated outer ring portion.

9. A vehicle wheel cover structure comprising
an axially outer spoked cover plate having a first set of circumferentially spaced spokes including a central plate portion and an outer exposed ring portion with the spokes being formed integral at one end with an outer margin of the central plate portion and integral with an axially inner margin of the outer ring portion, the outer exposed ring portion having circumferentially spaced open sided notches at its inner margin, an axially inner spoked cover plate having a second set of circumferentially spaced spokes disposed circumferentially between the spokes of said first set and having an inner plate portion and an outer concealed ring portion disposed axially behind said central plate portion and said outer exposed ring portion with said second set of spokes having outer spoke end portions engaged in said notches in said outer exposed ring portion, said spokes having simulated ferrules at radially outer ends at junctions of the spokes with the associated outer ring portion, means substantially lockingly encasing radially inner ends of the spokes in both sets, said means including a pair of cover members each having circumferentially spaced notches with the notches on one of the cover members engaged with the radially inner ends of the first set of spokes in one of the sets and with the notches on another of the cover members engaged with the radially inner ends of the second set of spokes, and means mounted on an underside of the cover structure for securing the cover structure in removable assembly with a vehicle wheel.

10. A vehicle wheel cover structure comprising
an axially outer spoked cover plate having a first set of circumferentially spaced spokes including a central plate portion and an outer exposed ring portion with the spokes being formed integral at one end with an outer margin of the central plate portion and integral with an axially inner margin of the outer ring portion, an axially inner spoked cover plate having a second set of circumferentially spaced spokes disposed circumferentially between the spokes of said first set and having an inner plate portion disposed axially behind said central plate portion, an axially inner cover member positioned over the central plate portion on said axially inner spoked cover plate having an axially extending skirt at its outer margin provided with skirt notches engaged over radially inner ends of said second set of spokes, an axially outer circular cover member positioned axially outwardly of the central plate portion on said axially outer spoked cover plate having an axially extending radially inner skirt at its outer margin positioned radially inwardly of the other of said skirts and with skirt notches engaged over radially inner ends of said first set of spokes, the sets of spokes being disposed in crossed relation for reinforcing the cover structure, and means mounted on an underside of the cover structure for securing the cover structure in removable assembly with a vehicle wheel.

References Cited in the file of this patent

UNITED STATES PATENTS

| | | |
|---|---|---|
| Re. 25,144 | Lyon | Mar. 27, 1962 |
| 2,709,114 | Plotkin | May 24, 1955 |
| 2,824,766 | Lyon | Feb. 25, 1958 |
| 2,928,694 | Lyon | Mar. 15, 1960 |

FOREIGN PATENTS

| | | |
|---|---|---|
| 532,673 | Italy | Aug. 29, 1955 |